(12) United States Patent
Iwai (10) Patent No.: US 8,525,491 B2
(45) Date of Patent: Sep. 3, 2013

(54) VEHICLE GENERATOR

(75) Inventor: Hiroki Iwai, Toyoake (JP)

(73) Assignee: Denso Corporation, Kariya (JP)

( * ) Notice: Subject to any disclaimer, the term of this patent is extended or adjusted under 35 U.S.C. 154(b) by 406 days.

(21) Appl. No.: 13/039,744

(22) Filed: Mar. 3, 2011

(65) Prior Publication Data

US 2011/0215773 A1    Sep. 8, 2011

(30) Foreign Application Priority Data

Mar. 8, 2010    (JP) ................................. 2010-050861

(51) Int. Cl.
*H02P 11/00* (2006.01)
*H02P 9/00* (2006.01)
*H02H 7/06* (2006.01)

(52) U.S. Cl.
USPC .............................................. 322/28; 322/27

(58) Field of Classification Search
USPC ................................................... 322/27, 28
See application file for complete search history.

(56) References Cited

U.S. PATENT DOCUMENTS

| | | | | |
|---|---|---|---|---|
| 3,938,490 A | * | 2/1976 | Snyder et al. .................. | 123/611 |
| 4,027,215 A | * | 5/1977 | Knight et al. ............ | 318/400.01 |
| 4,238,717 A | * | 12/1980 | Knight et al. ............ | 318/400.25 |
| 4,492,903 A | * | 1/1985 | Knight et al. ............ | 318/400.15 |
| 4,498,128 A | * | 2/1985 | Peterson et al. ........... | 363/21.08 |
| 5,267,138 A | * | 11/1993 | Shores ............................ | 363/98 |
| 7,541,751 B2 | * | 6/2009 | Vaziri ........................... | 315/307 |
| 2001/0036088 A1 | * | 11/2001 | Wittenbreder, Jr. ............. | 363/17 |
| 2001/0054882 A1 | * | 12/2001 | Nakamura et al. ............... | 322/28 |
| 2003/0030409 A1 | | 2/2003 | Kusumoto et al. ............ | 318/801 |
| 2008/0218101 A1 | * | 9/2008 | Vaziri ........................... | 315/307 |
| 2011/0204856 A1 | * | 8/2011 | Horihata ......................... | 322/27 |

FOREIGN PATENT DOCUMENTS

| JP | B2 3517405 | 4/2004 |
|---|---|---|
| JP | A 2009-130954 | 6/2009 |

* cited by examiner

*Primary Examiner* — Pedro J Cuevas
(74) *Attorney, Agent, or Firm* — Oliff & Berridge, PLC (57) ABSTRACT

The vehicle generator includes an armature winding, a switching section constituted as a bridge circuit including a plurality of pairs of an upper arm and a lower arm to rectify phase voltages of the armature winding, each of the upper and lower arms being constituted of a switching element parallel-connected with a diode, and a control section for controlling on/off timings of the switching elements. The control section is configured to perform switching operation to switch the switching section between a first operation state where each upper arm is turned off when the phase voltage is higher than a voltage of a vehicle battery, and a second operation state where each upper arm is turned off after the phase voltages becomes lower than the battery voltage, and configured to delay off timings of the switching elements stepwise when the switching section is in the second operation state.

10 Claims, 6 Drawing Sheets

VEHICLE GENERATOR

This application claims priority to Japanese Patent Application No. 2010-50861 filed on Mar. 8, 2010, the entire contents of which are hereby incorporated by reference.

BACKGROUND OF THE INVENTION

1. Field of the Invention

The present invention relates to a vehicle generator mounted on a vehicle such as a passenger car or a truck.

2. Description of Related Art

There is known a power converter having a structure in which switching is made from diode rectification to synchronous rectification such that proportion of the synchronous rectification is increased gradually. For example, refer to Japanese Patent Application Laid-open No. 2009-130954 (patent document 1). This patent document 1 describes preventing large voltage variations by gradually decreasing a conduction period of rectifying diodes from 100%, while gradually increasing a conduction period of switching elements constituted of MOSFETs.

There is also known a vehicle electric rotating machine configured to interrupt its excitation current for a predetermined time period at the time of switching from power generation for a target power generation voltage through control of the excitation current (synchronous control mode) to power generation through energization of an inverter (phase control mode), and thereafter restore the excitation current, in order to prevent an uncontrollable state of the power generation voltage. For example, refer to Japanese Patent No. 3517405 (patent document 2).

However, the vehicle electric rotating machine disclosed in patent document 2 has a problem in that large variation occurs in its output or torque at the time of switching from the synchronous control mode to the phase control mode, because the excitation current is interrupted to stop power generation temporarily during this switching. Further, since the power generation after the switching is performed through energization of the inverter such that the period of the synchronous rectification is delayed, it is not possible to apply the technique disclosed in patent document 1 to the vehicle electric rotating machine disclosed in patent document 2 to reduce variation in its output or torque.

SUMMARY OF THE INVENTION

An embodiment provides a vehicle generator comprising:

an armature winding including a plurality of phase windings;

a switching section constituted as a bridge circuit including a plurality of pairs of an upper arm and a lower arm connected in series to rectify phase voltages induced in the phase windings, each of the upper and lower arms being constituted of a switching element parallel-connected with a diode; and a control section for controlling on/off timings of the switching elements;

wherein the control section is configured to perform a switching operation to switch the switching section between a first operation state where, for each of the pairs of the upper and lower arms, the upper arm is turned off when a corresponding one of the phase voltages is higher than a battery voltage of a battery charged by the vehicle generator through the switching section and a second operation state where, for each of the pairs of the upper and lower arms, the upper arm is turned off after a corresponding one of the phase voltages becomes lower than the battery voltage, and configured to delay off timings to turn off the switching elements stepwise when the switching section is in the second operation state.

According to the present invention, there is provided a vehicle generator capable of preventing rapid variation in its output current and power generation torque at the time of switching from the synchronous control mode to the phase control mode.

Other advantages and features of the invention will become apparent from the following description including the drawings and claims.

PREFERRED EMBODIMENTS OF THE INVENTION

Figure 1:
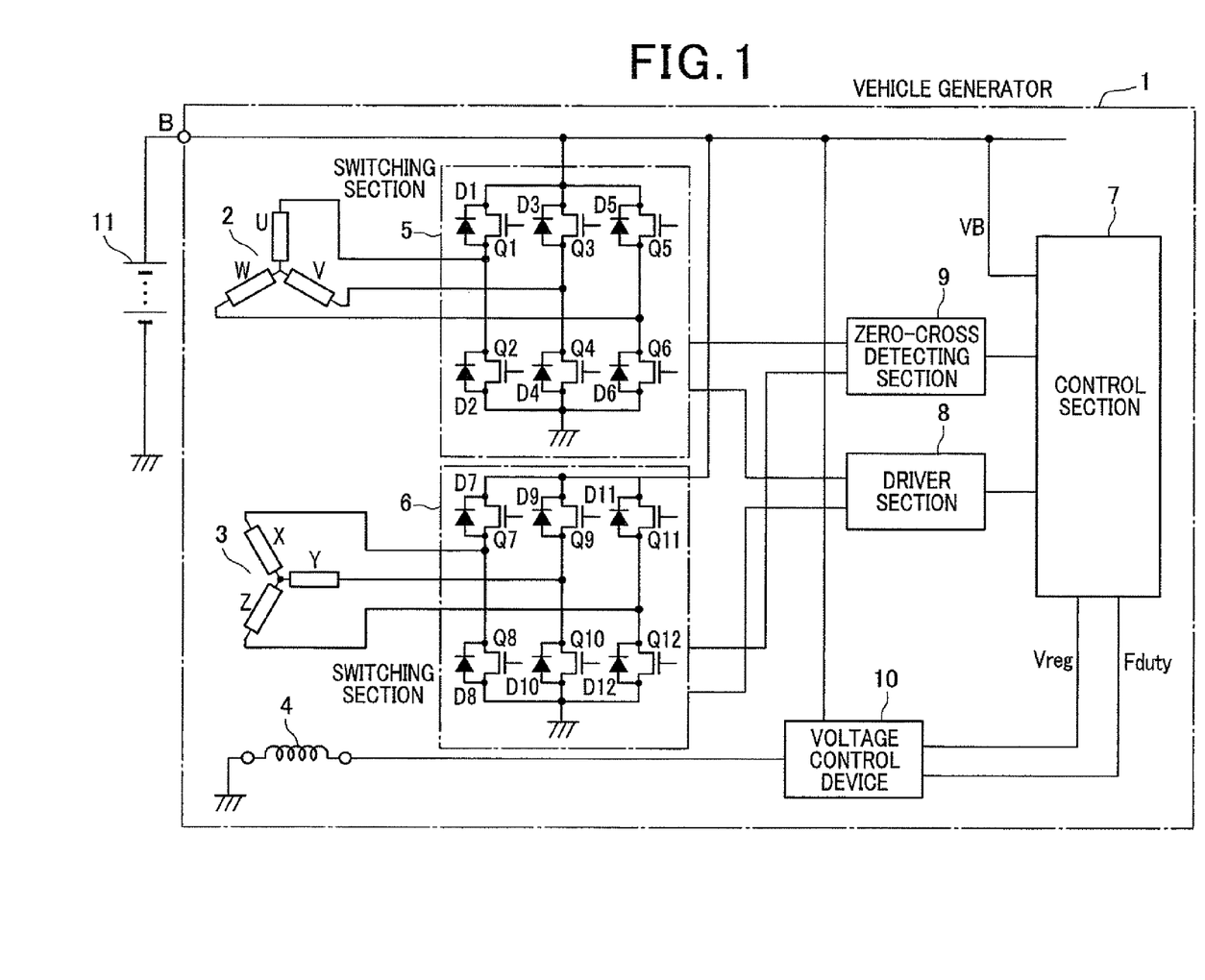
FIG. 1 is a diagram showing the structure of a vehicle generator according to an embodiment of the invention.

FIG. 1 is a diagram showing the structure of a vehicle generator 1 according to an embodiment of the invention. As shown in FIG. 1, the vehicle generator 1 includes armature windings 2 and 3, a field winding 4, switching sections 5 and 6, a control section 7, a driver section 8, a zero-cross detecting section 9, and a voltage control device 10. This vehicle generator 1 performs power generating operation in which AC voltages induced in the armature windings 2 and 3 are rectified by the switching sections 5 and 6, and supplied to a battery 11 and various electrical loads (not shown). This vehicle generator 1 may be configured to perform also power-driven operation (motor operation) in which DC power supplied from the battery 11 is converted into three-phase AC voltage by the switching sections 5 and 6, and applied to the armature windings 2 and 3 to drive the rotor (not shown) of the vehicle generator 1 to rotate.

The armature winding 2, which is a multi-phase winding (three-phase winding in this embodiment), is wound around an armature core to constitute an armature. The AC outputs induced in the respective phase windings of the armature winding 2 are supplied to the switching section 5. The armature winding 3, which is a multi-phase winding (three-phase winding in this embodiment), is wound around an armature core to constitute an armature. The armature windings 2 and 3 are wound so as to have a positional displacement of 30 degrees in electrical angle therebetween. The AC outputs induced in the respective phase windings of the armature winding 3 are supplied to the switching section 6. The field winding 4 is wound around not-shown magnetic poles to constitute a rotor of the vehicle generator 1. By passing an excitation current to the field winding 4, the magnetic poles are magnetized.

The switching section 5 is formed as a bridge circuit disposed between the armature winding 2 and the battery 11, and including a plurality of (three in this embodiment) upper arms and a plurality of (three in this embodiment) lower aims. Each of these arms is constituted of a switching element parallel-connected with a diode. More specifically, the armature winding 2 includes a U-phase winding, a V-phase winding and a W-phase winding which are Y-connected with one another. The U-phase winding is connected with a pair of a switching element Q1 and a diode D1 as an upper arm, and a pair of a switching element Q2 and a diode D2 as a lower arm. The V-phase winding is connected with a pair of a switching element Q3 and a diode D3 as an upper arm, and a pair of a switching element Q4 and a diode D4 as a lower arm. The W-phase winding is connected with a pair of a switching element Q5 and a diode D5 as an upper arm, and a pair of a switching element Q6 and a diode D6 as a lower arm.

The switching section 6 is formed as a bridge circuit disposed between the armature winding 3 and the battery 11, and including a plurality of (three in this embodiment) upper arms and a plurality of (three in this embodiment) lower arms. Each of these arms is constituted of a switching element parallel-connected with a diode. More specifically, the armature winding 3 includes a X-phase winding, a Y-phase winding and a Z-phase winding which are Y-connected with one another. The X-phase winding is connected with a pair of a switching element Q7 and a diode D7 as an upper arm, and a pair of a switching element Q8 and a diode D8 as a lower arm. The Y-phase winding is connected with a pair of a switching element Q9 and a diode D9 as an upper arm, and a pair of a switching element Q10 and a diode D10 as a lower arm. The Z-phase winding is connected with a pair of a switching element Q11 and a diode D11 as an upper arm, and a pair of a switching element Q12 and a diode D12 as a lower arm.

In this embodiment, as the switching elements Q1 to Q12, there are used MOSFETs which are low loss compared to diodes commonly used for a rectifier circuit. In the case of using such MOSFETs, parasitic diodes (body diodes) of these MOSFETs can be used as the diodes D1 to D12.

The control section 7 determines on/off timings of the switching elements Q1 to Q12 included in the switching sections 5 and 6. The driver section 8 drives the switching elements Q1 to Q12 in accordance with the on/off timings determined by the control section 7. The control section 7 can be implemented by a control program executed by a CPU included therein. However, the control section 7 may be implemented by a hardware logic constituted of circuit elements.

The zero-cross detecting section 9 detects, as zero-cross points, time points at which the phase currents flowing through the switching elements Q1 to Q12 and the diodes parallel-connected thereto change in their directions, or becomes 0 from a positive or negative value. The zero-cross detecting section 9 detects zero-cross points individually for each of the upper and lower arms of the respective phase windings.

The voltage control device 10 controls the excitation current flowing through the field winding 4 by on-off controlling a not shown switching element. For example, the voltage control device 10 controls the excitation current such that the output voltage of the vehicle generator 1 or the battery voltage is kept at a predetermined regulation voltage.

Next, the operation of the vehicle generator 1 having the above described structure is explained. The switching elements Q1 to Q12 are each parallel-connected with the diode (body diode), and accordingly rectifying operation is performed even when they are not tuned on, because the phase current can flow through the diodes when the phase voltage is higher than the terminal voltage (battery voltage) of the battery 11. Here, a mode in which these switching elements are turned on and off in accordance with the conduction periods of their diodes is referred to as "synchronous control mode". If each of the switching elements is kept on until a time later than the conduction period of its diode, a phenomenon occurs where a battery current is drawn from the battery 11 through the switching element when the phase voltage becomes lower than the terminal voltage of the battery 12. Here, a mode in which each of the switching elements is turned on and off to generate such a drawn current is referred to as "phase control mode".

The synchronous control mode is superior to the phase control mode in power generation efficiency. On the other hand, the phase control mode enables to generate a larger output current compared to the synchronous control mode. Accordingly, it is preferable that the vehicle generator 1 operates in the synchronous control mode when the required amount of power generation (or output current) is small, or when the rotational speed thereof is high, and operates in the phase control mode when the rotational speed thereof is low and the required amount of power generation is large.

Figure 2:
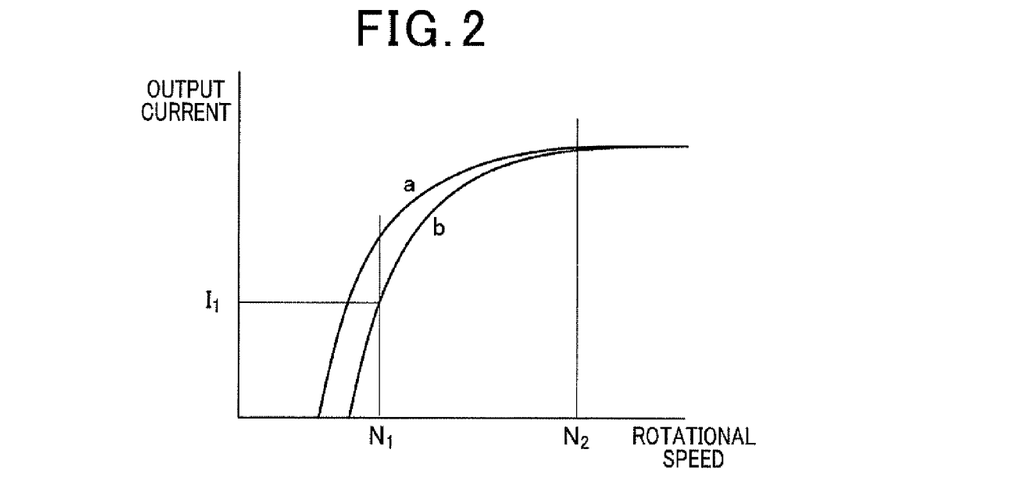
FIG. 2 is an explanatory view showing boundary between a synchronous control mode and a phase control mode of the vehicle generator.

FIG. 2 is an explanatory view showing boundary between the synchronous control mode and the phase control mode. In FIG. 2, the vertical axis represents the output current of the vehicle generator', and the horizontal axis represents the rotational speed of the vehicle generator 1. The curve a shows the output characteristic of the vehicle generator 1 when it operates in the phase control mode, and the curve b shows the output characteristic of the vehicle generator 1 when it operates in the synchronous control mode.

In this embodiment, the vehicle generator 1 operates in the synchronous control mode when the output current is smaller than or equal to $I_1$ obtainable when the vehicle generator 1 operates in the synchronous control mode at the rotational speed of $N_1$. The vehicle generator 1 operates in the synchronous control mode also when the rotational speed thereof is higher than or equal to $N_2$ above which the output current becomes sufficiently large even when the vehicle generator 1 operates in the synchronous control mode, and there is no significant difference in the output current whether the vehicle generator 1 operates in the synchronous control mode or phase control mode. The vehicle generator 1 operates in the phase control mode when the output current exceeds a value available when the vehicle generator 1 operates in the synchronous control mode at the rotational speed lower than $N_2$.

In the following, it is explained how on/off timings of the switching elements are set for each of the synchronous control mode and the phase control mode.

Figure 3:
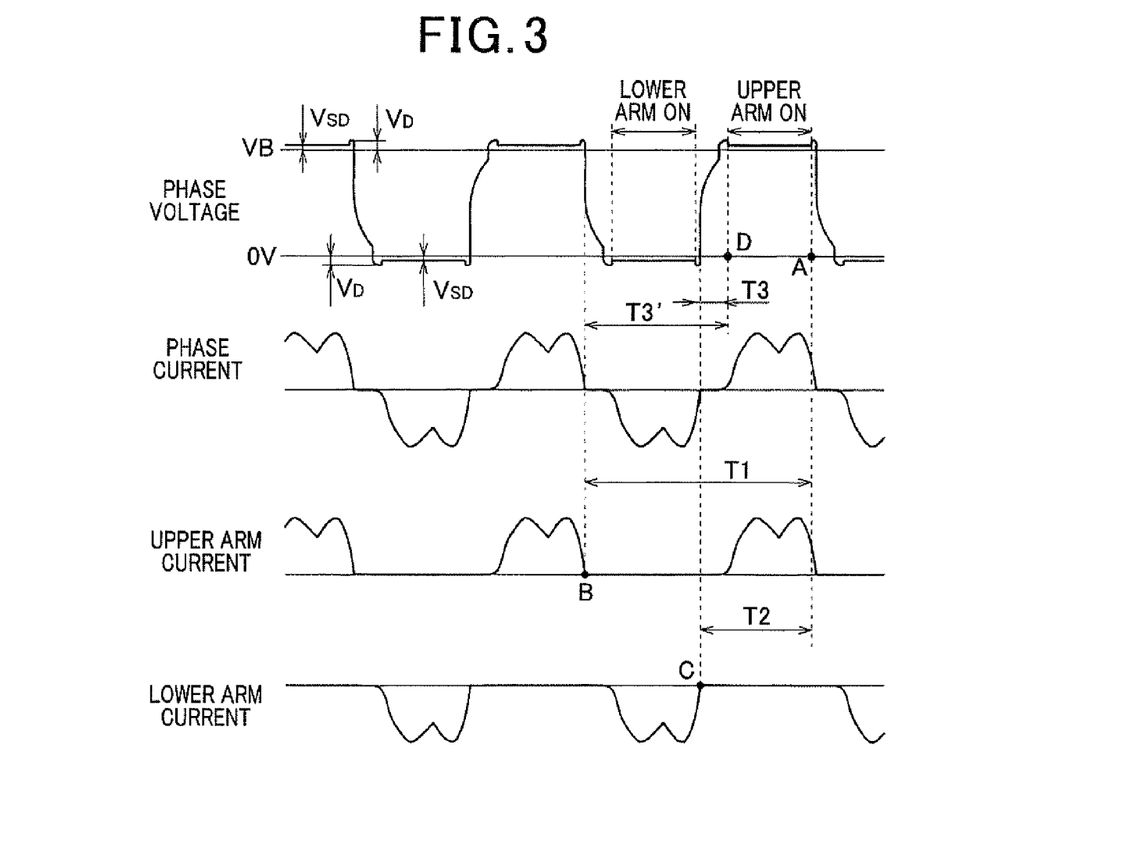
FIG. 3 is a diagram showing a phase voltage and a phase current when the vehicle generator operates in the synchronous control mode.

First, explanation is made for the synchronous control mode. FIG. 3 is a diagram showing the U-phase voltage and U-phase current when the vehicle generator 1 operates in the synchronous control mode. The U-phase current can be divided into a first component flowing through the switching element Q1 and the diode D1 as an upper arm, and a second component flowing through the switching element Q2 and the diode D2 as a lower arm. In FIG. 3 and later described FIG. 4, the first component is shown as "upper arm current", and the second component is shown as "lower arm current". Further, in FIG. 3 and later described FIG. 4, $V_D$ indicates the forward voltage of the diode, and $V_{SD}$ indicates the source-drain voltage of the switching element when it is turned on.

In FIG. 3, the off timing A of the switching element Q1 of the upper arm corresponding to the U-phase winding is set to a time after lapse of a predetermined time T1 or T2 from the time of the previous zero-cross point B of this upper arm, or from the time of the most recent zero-cross point C of the lower arm corresponding to this same U-phase winding. This predetermined time T1 or T2 can be indicated as a predetermined electrical angle. In this case, to calculate the predetermined electrical angle, it is necessary to detect the rotational speed of the vehicle generator 1. In this embodiment, the control section 7 detects the rotational speed based on the interval of zero-cross points of the upper arm current, or interval between zero-cross points of the upper arm current and zero-cross points of the lower arm current to calculate the predetermined time T1 or T2. Incidentally, it is possible to detect variation of the rotational speed by monitoring variation of the zero-cross point interval for three or more zero-cross points, in order to calculate more accurately the predetermined time T1 or T2 taking into account variation of the rotational speed, to thereby set more accurately off timings.

Likewise, the control section 7 sets, as off timing of the switching element Q2 of the lower arm, a time after lapse of a predetermined time from the time of the previous zero-cross point of this lower arm, or from the time of the most recent zero-cross point of the upper arm corresponding to this same U-phase winding.

The off timing D of the switching element Q1 of the upper a corresponding to the U-phase winding is set to a time after lapse of a predetermined time T3 from the time of the most recent zero-cross point C of the lower arm upper arm corresponding to this same U-phase winding. This predetermined time T3 can be indicated as a predetermined electrical angle. Like in the above, it is necessary to detect the rotational speed of the vehicle generator 1 to calculate the predetermined electrical angle, and it is possible to set more accurately on timings by taking into account variation of the rotational speed.

Likewise, the control section 7 sets, as on timing of the switching element Q2 of the lower atm, a time after lapse of a predetermined time from the time of the most recent zero-cross point of the upper arm corresponding to this same U-phase winding.

Incidentally, although on timing of each of the switching elements Q1 and Q2 is set based on the most recent zero-cross point of the other arm in this embodiment, it may be set to a time after lapse of a predetermined time T3' from the time of the zero-cross point of its arm.

The above explanation is for the method of determining on/off timings of the switching elements Q1 and Q2 corresponding to the U-phase winding. Since on and off timings of the switching elements Q3 to Q12 of the other phase windings can be set by the same method, explanations for setting on/off timings of the switching elements Q3 and Q12 are omitted here.

Figure 4:
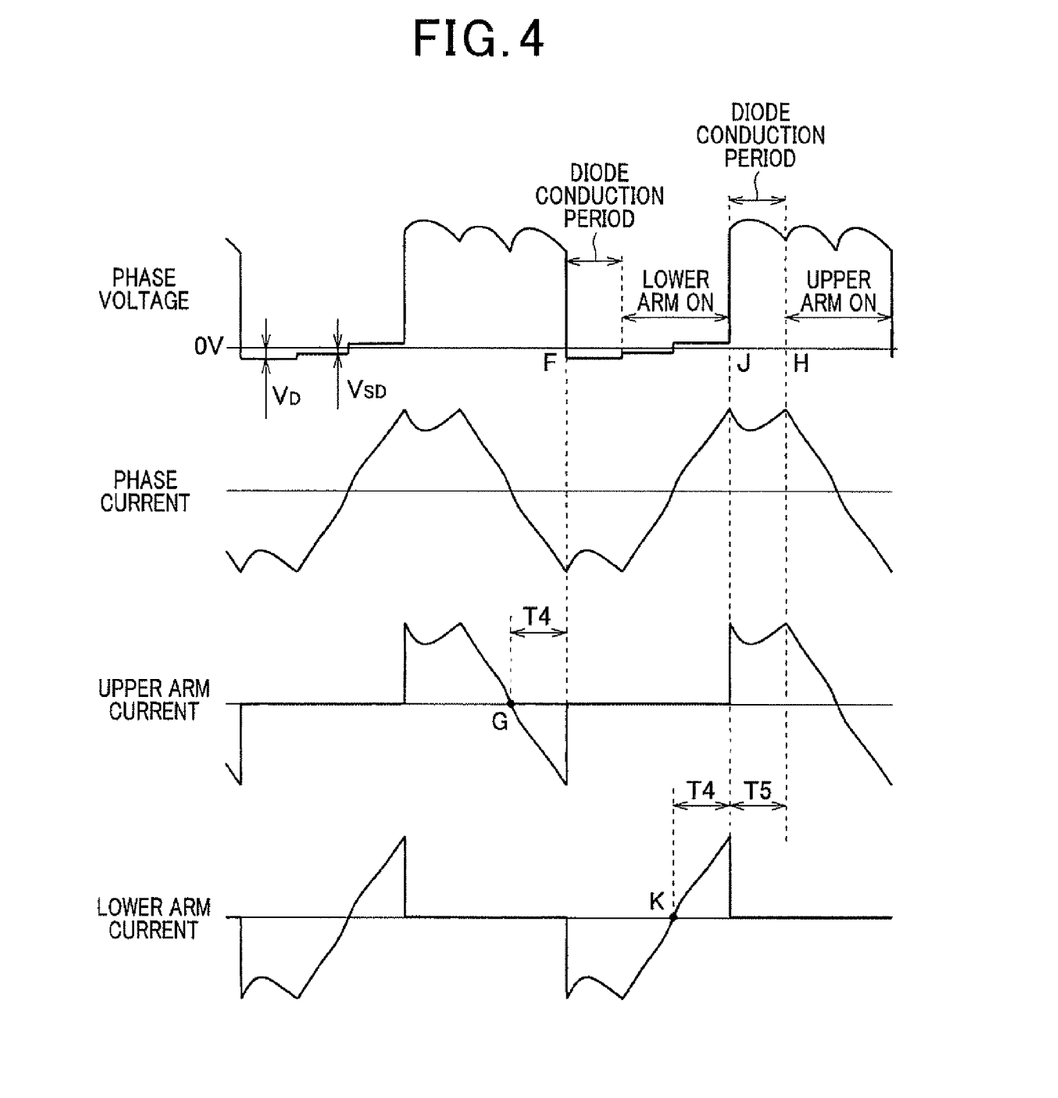
FIG. 4 is a diagram showing a phase voltage and a phase current when the vehicle generator operates in the phase control mode.

Next, explanation is made for the phase control mode. FIG. 4 is a diagram showing the phase voltage and phase current (the U-phase voltage and U-phase current in FIG. 4) when the vehicle generator 1 operates in the phase control mode.

In FIG. 4, the off timing F of the switching element Q1 of the upper arm corresponding to the U-phase winding is set to a time after lapse of a predetermined time T4 from the time of the most recent zero-cross point G of this upper arm. The predetermined time T4 is determined depending on the battery voltage and electrical load (required output). As in the case of the synchronous control mode, the predetermined time T4 can be indicated as a predetermined electrical angle, and it is necessary to detect the rotational speed of the vehicle generator 1 to calculate the predetermined electrical angle in order to set more accurately on/off timings by taking into account variation of the rotational speed.

Likewise, off timing of the switching element Q2 of the lower arm is set to a time after lapse of a predetermined time from the time of the most recent zero-cross point of this lower arm.

The control section 7 determines, as the on timing H of the switching element Q1 of the upper arm corresponding to the U-phase winding, a time after lapse of a predetermined time T5 from the time point J at which the switching element Q2 of the lower arm corresponding to this same U-phase winding was turned off. This predetermined time T5 is a margin time to ensure turning off of the switching element Q2 of the opposite arm in order to prevent a short circuit between the upper and lower arms. Like the setting of off timing described above, the predetermined time T5 can be indicated as a predetermined electrical angle, and it is necessary to detect the rotational speed of the vehicle generator 1 to calculate the predetermined electrical angle in order to set more accurately on timing by taking into account variation of the rotational speed.

Since off timing of the switching element Q2 of the lower arm is set to a time after lapse of the predetermined time T4 from the most recent zero-cross point of the lower arm, it can be said that on timing of the switching element Q1 of the upper arm is set to a time after lapse of the time of T4+T5 from the time of the most recent zero-cross point (K) of the lower arm.

Likewise, the control section 7 sets, as on timing of the switching element Q2 of the lower arm, a time after lapse of a predetermined time from the time point at which the switching element Q1 of the upper arm corresponding to this same U-phase winding was turned off.

As explained above, since the vehicle generator 1 of this embodiment detects the phases (directions) of the phase currents by detecting zero-cross points through the zero-cross detecting section 9, it is possible to accurately control the phases of the phase currents.

Further, since off timings of the switching elements are set based on zero-cross points at which the currents flowing into the respective switching elements change in polarity (direction) in the phase control mode, it is possible to turn off the switching elements after the currents flowing into the switching elements reverse in direction (that is, after the current drawing from the battery 11 into the phase windings is started), to thereby increase the output current.

Further, since off timings of the switching elements are set based on the past zero-cross points (B or C shown in FIG. 3) when the output current is small or the rotational speed is high, it becomes possible to perform rectification through synchronous control in a like manner as in diode rectification.

In the phase control mode, one of the upper and lower arms is turned on after lapse of a predetermined time from the time point at which the other of the upper and lower arms was turned off for each of the phase windings. In the synchronous control mode performed when the output current is small or the rotational speed is high, one of the upper and lower arms is turned on based on the zero-cross point (C shown in FIG. 3) of the current flowing through the other of the upper and lower arms. This makes it possible to prevent the upper and lower arms of each of the phase windings from being turned on at the same time, to thereby prevent occurrence of a large loss due to a surge voltage or a short circuit between the terminals of the battery 11.

Incidentally, although switching from the synchronous control mode to the phase control mode is performed depending on whether the output current exceeds the value of $I_1$ obtainable when the vehicle generator operates in the synchronous control mode, or (2) whether the rotational speed is above $N_2$, it is not undesirable that the output current increases rapidly causing the power generation torque to increase rapidly at the time of switching from the synchronous control mode to the phase control mode in view of engine speed stabilization. The same applies to switching from the phase control mode to the synchronous control mode. Accordingly, in this embodiment, off timing of each switching element is changed stepwise in order to prevent the output current and the power generation torque from being increased significantly at the time of performing the above control mode switching (1).

Figure 5:
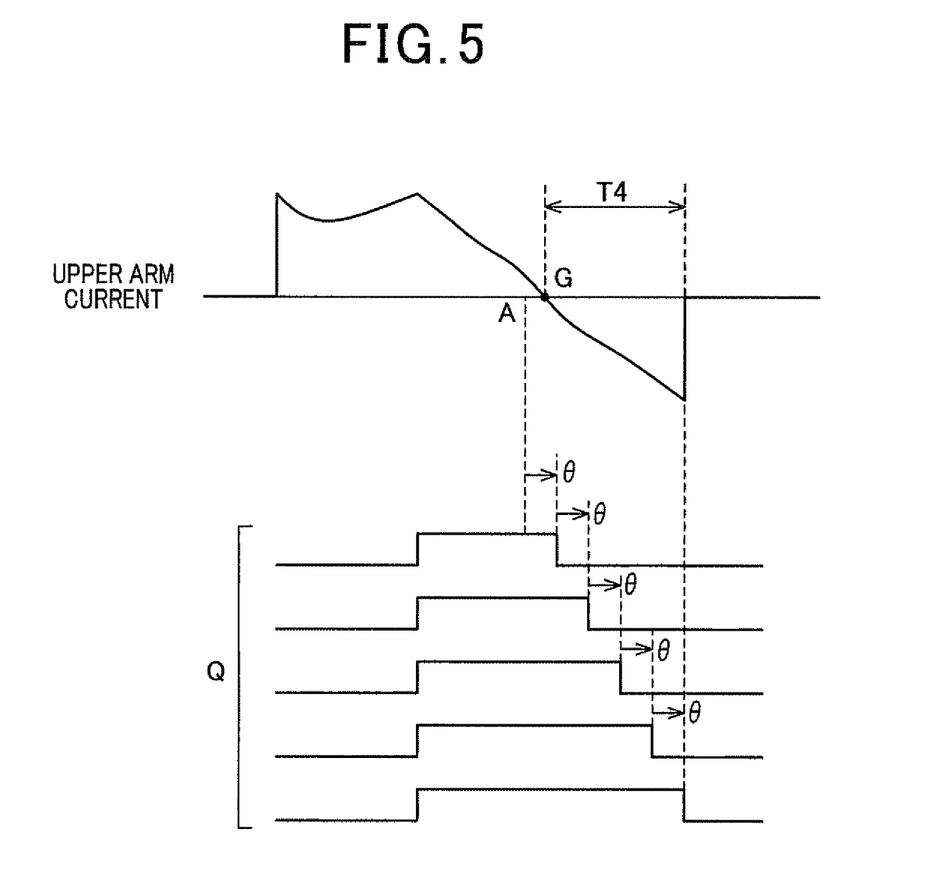
FIG. 5 is a diagram for explaining a switching operation to switch from the synchronous control mode to the phase control mode.

FIG. 5 is an explanatory view for explaining operation of switching from the synchronous control mode to the phase control mode. The legend "UPPER ARM CURRENT" in FIG. 5 indicates the upper arm current in the vicinity of the zero-cross point G shown in FIG. 4, and the legend "Q" indicates on/off timings of the switching element of the upper arm. The legend "A" in FIG. 5 indicates the off timing A of the switching element in the synchronous control mode shown in FIG. 3. Here, consideration is given to the case where off timing of the switching element is set to a time after lapse of the predetermined time T4 from the zero-cross point G in the phase control mode to obtain the output current corresponding to a required power generation amount. As shown in FIG. 5, in this embodiment, immediately after the synchronous control mode is switched to the phase control mode, off timing of the switching element is set to a time delayed by a delay time θ (<T4) in electrical angle from the off timing A in the synchronous control mode. After lapse of a predetermined time in this state, the off timing of the switching element is further delayed by the delay time 8 in electrical angle. In this way, the off timing is successively delayed by the delay time θ at the every predetermined period until it is delayed by T4 from the zero-cross point G. The same applies to switching from the phase control mode to the synchronous control mode. That is, when off timing of the switching element is set to a time after lapse of the predetermined time T4 from the time of the zero-cross point G in the phase control mode, switching to the synchronous control mode is made by successively advancing the off timing of the switching element at every predetermined period. The value of the delay time θ may be changed at the every predetermined period.

Figure 6:
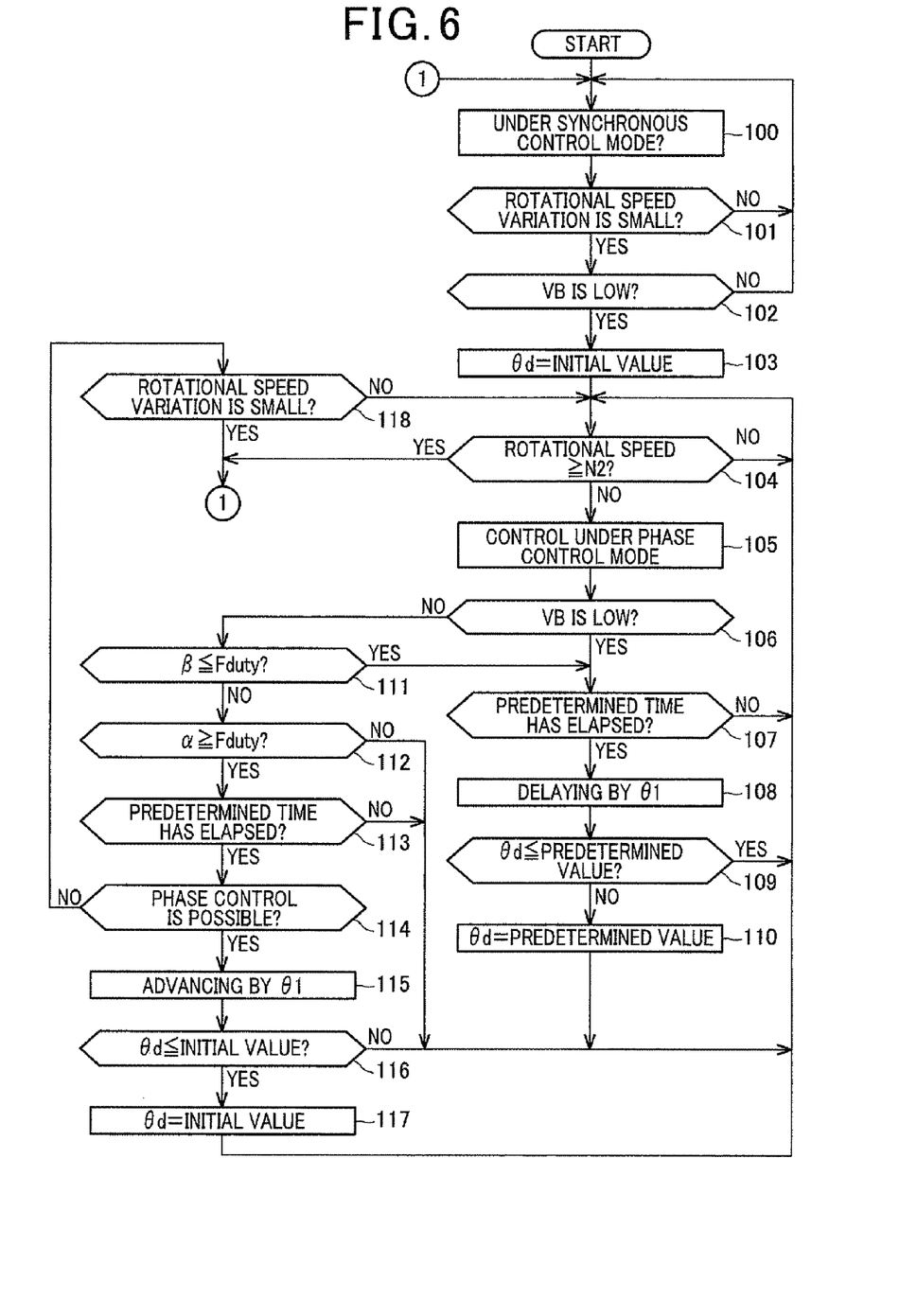
FIG. 6 is a flowchart showing procedure to change stepwise off timings of switching elements of the vehicle generator at the time of switching from the synchronous control mode to the phase control mode.

FIG. 6 is a flowchart showing the procedure to change stepwise off timings of the switching elements during switching between the synchronous control mode and the phase control mode. Initially, the control section 7 performs on-off control of the switching elements in the synchronous control mode (step 100). In this state, the control section 7 determines whether or not variation of the rotational speed is within a predetermined range (step 101). Variation of the rotational speed can be detected based on the period of zero-cross points detected by the zero-cross detecting section 9. If the determination result in step 100 is negative, the procedure returns to step 100 to continue the synchronous control mode.

If the determination result in step 100 is affirmative, the procedure proceeds to step 102 to determine whether or not the power generation voltage VB has fallen below a predetermined value. Step 101 is for determining whether a large current larger than the output current available in the synchronous control mode has flown. In step 101, if the power generation voltage VB falls below the regulation voltage Vreg set by the voltage control device 10, the procedure proceeds to step 103, while, if the power generation voltage VB is equal to (or within a certain range around) the regulation voltage Vreg, the procedure returns to step 100 to continue the synchronous control mode.

In step 103, the control section 7 sets the delay time θ with respect to the respective off timings of the switching elements in the synchronous control mode to an initial delay value. Subsequently, the control section 7 determines whether or not the rotational speed is higher than or equal to $N_2$ (step 104). If the determination result in step 104 is affirmative, the procedure returns to step 100 to continue the synchronous control mode. If the determination result in step 104 is negative, the procedure proceeds to step 105 to perform on-off control of the switching elements in the phase control mode. Incidentally, immediately after the synchronous control mode is switched to the phase control mode, the phase control mode is performed with off timings of the switching elements being delayed by the initial delay value set in step 103.

In subsequent step 106, the control section 7 determines whether or not the power generation voltage VB has fallen below a predetermined value. If the determination result in step 106 is affirmative, the procedure proceeds to step 107 to determine whether a predetermined period has elapsed after switching is made to the phase control mode (or after off timing has been delayed in step 108). If the determination result in step 107 is negative, the procedure returns to step 104 to determine whether or not the rotational speed is higher than or equal to $N_2$.

If the determination result in step 107 is affirmative, the procedure proceeds to step 107 to delay off timings of the switching elements in the phase control mode by a value of θ1 in electrical angle. In subsequent step 109, the control section 7 determines whether or not the delay θd of the off timing is smaller than or equal to a predetermined time. If the determination result in step 109 is affirmative, the procedure returns to step 104 to determine whether or not the rotational speed is higher than or equal to $N_2$. If the determination result in step 109 is negative, the procedure proceeds to step 110 to set the delay θd to the predetermined time. Thereafter, the procedure returns to step 104 to determine whether or not the rotational speed is higher than or equal to $N_2$.

If the determination result in step 106 is negative, the procedure proceeds to step 111 where the control section 7 determines whether or not a drive duty Fduty of the switching element (not shown) included in the voltage control device 10, which is used for fine output adjustment (fine adjustment of the output of the vehicle generator), is larger than or equal to an upper limit value β corresponding to the upper limit of the range of the fine output adjustment. If the determination result in step 111 is affirmative, the procedure returns to step 107 to determine whether the predetermined period has elapsed after switching is made to the phase control mode (or after the off timing has been delayed in step 108). If the determination result in step 111 is negative, the procedure proceeds to step 112 to determine whether the drive duty Fduty has fallen below or equal to a lower limit value α corresponding to the lower limit of the range of the fine output adjustment. Step 112 is for detecting whether or not the load current has been reduced to such an extent that it is necessary to reduce the delay θd of off timings of the switching elements in the phase control mode. If the determination result in step 112 is negative, the procedure returns to step 104 to determine whether or not the rotational speed is higher than or equal to $N_2$.

If the determination result in step 112 is affirmative, the procedure proceeds to step 113 to determine whether or not the predetermined period has elapsed after the synchronous control was switched to the phase control mode (or after the off timing was advanced in step 115). If the determination result in step 113 is negative, the procedure proceeds to step 104 to determine whether or not the rotational speed is higher than or equal to $N_2$.

If the determination result in step 113 is affirmative, the procedure proceeds to step 114 where the control section 7 determines if it is possible for the vehicle generator 1 operates in the phase control mode when off timings of the switching elements are further advanced. A negative determination is made in step 114 when the phase voltages will be always higher than the battery voltage VB if off timings of the switching elements are further advanced. In this case, the procedure proceeds to step 118 where the control section 7 determines whether variation of the rotational speed is smaller than a predetermined value. If the determination result in step 118 is negative, the procedure returns to step 104 to determine whether or not the rotational speed is higher than or equal to $N_2$. If the determination result in step 118 is affirmative, the procedure returns to step 100 to perform the synchronous control mode.

An affirmative determination is made in step 114 when the battery voltage VB will be higher than the phase voltages at least pat of the on period of each switching element even if off timings of the switching elements are further advanced. In this case, the procedure proceeds to step 115 where the control section 7 advances off timings of the switching elements by the value of the θ1. Subsequently, the control section 7 determines whether or not the delay θd of off timings of the switching elements will be smaller than or equal to the initial value after they are further advanced (step 116). If the determination result is negative, the procedure returns to step 104 to determine whether or not the rotational speed is higher than or equal to $N_2$. If the determination result is affirmative, the procedure proceeds to step 117 to set the delay θd to the initial value. Thereafter, the procedure returns to step 104 to determine whether or not the rotational speed is higher than or equal to $N_2$.

As explained above, according to this embodiment, it is possible to reduce variation of the output current at the time of switching from the synchronous control mode to the phase control mode, to thereby prevent the power generation torque from varying excessively. Further, since the phases (directions) of the phase currents are detected directly by the zero-cross detecting section 9, the periods and phases of the phase currents can be accurately estimated, and accordingly the phases of the phase currents can be accurately controlled.

Further, since switching between the synchronous control mode and the phase control mode is performed when variation of the rotational speed is within the predetermined range, it is possible to prevent variation of the output current and power generation torque due to variation of the rotational speed, and variation of the output current and power generation torque at the time of switching between the synchronous control mode and the phase control mode from occurring at the same time. Further, by performing the switching at intervals longer than the predetermined period, it is possible to prevent the switching from being performed frequently.

It is a matter of course that various modifications can be made to the above embodiment as described below. In the above embodiment, the conditions to perform switching from the phase control mode to the synchronous control mode includes that variation of the rotational speed is sufficiently small (step 118). However, the above embodiment may be modified such that all the switching elements are turned off when variation of the rotational speed exceeds a predetermined range to stop the operation in accordance with the phase control mode. This makes it possible to prevent the phases of the phase currents from becoming uncontrollable, causing control of the vehicle generator becoming unstable.

In the above embodiment, although no explanation has been given for a specific value of delay by which off timings of the switching elements are delayed stepwise in the phase control mode, it is preferable that it is set to a value enabling a coarse adjustment of the output current by delaying the off timings stepwise, and also enabling a fine adjustment of the output current by varying the excitation current. Particularly, it is preferable that variation of the output current between each adjacent off timings by the coarse adjustment is within an adjustable range of the output current by the fine adjustment by the excitation current during the stepwise change of the off timings of the switching elements.

Figure 7:
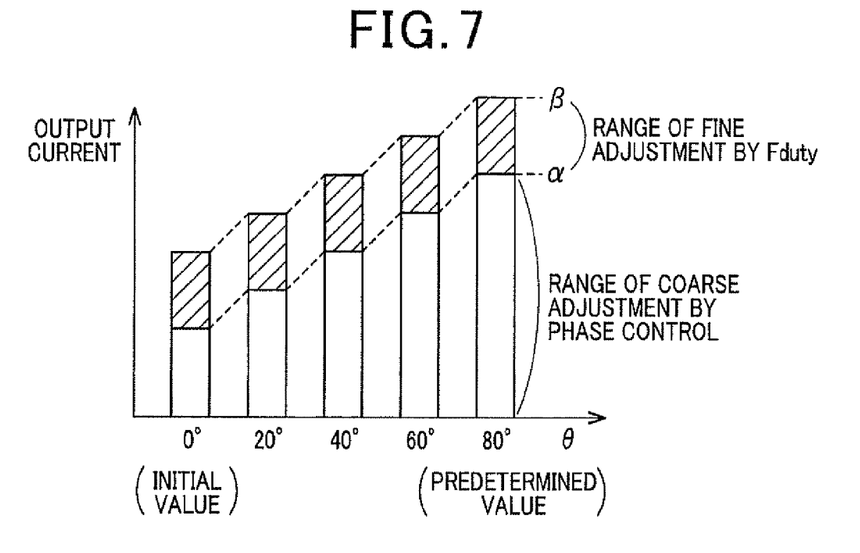
FIG. 7 is a diagram for explaining a relationship between coarse adjustment of the output current through stepwise change of off timings of the switching elements, and fine adjustment of the output current through control of the excitation current.

FIG. 7 is a diagram for explaining a relationship between the coarse adjustment of the output current through stepwise change of off timings of the switching elements, and the fine adjustment of the output current through control of the excitation current. In FIG. 7, the horizontal axis represents the delay θd in electrical angle of off timings of the switching elements with respect to those in the synchronous control mode. In FIG. 7, each hatched area represents an area within which the output current is finely adjustable through control of the excitation current in the phase control mode. As shown in FIG. 7, when the delay θd of off timings of the switching elements is changed stepwise, variation of the output current between each adjacent off timings is within the adjustable range through control of the excitation current during the switching. This makes it possible for the output current to change smoothly in accordance with the load current by varying the excitation current depending on variation of the load current.

In the above embodiment, the phase control mode is switched to the synchronous control mode when the drive duty Fduty is lowered. However, the above embodiment may be modified such that he phase control mode is switched to the synchronous control mode when the output current or the excitation current is lowered.

As shown in FIG. 1, in the above embodiment, one set of the control section 7, driver section 8 and zero-cross detecting section 9 is provided commonly for both the switching sections 5 and 6. However, one set of the control section 7, driver section 8 and zero-cross detecting section 9 may be provided for each of the switching sections 5 and 6, or for each of the phase windings.

Figure 8:
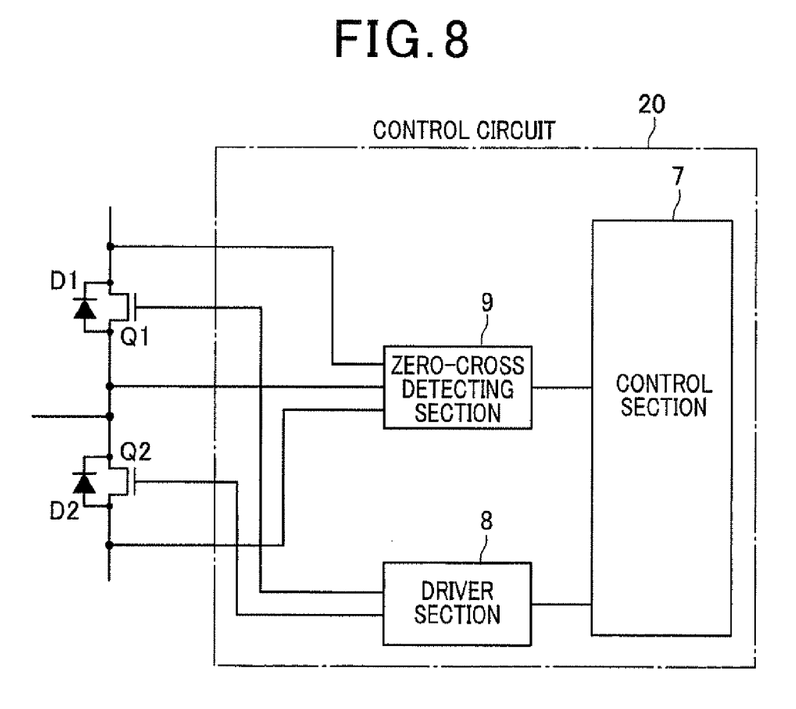
FIG. 8 is a diagram showing part of the structure of the vehicle generator modified such that its control section and so on are provided for each of the phase windings thereof.

FIG. 8 is a diagram showing part of the structure of the vehicle generator modified such that its control section and so on are provided for each of the phase windings thereof. In this structure, a control circuit 20 constituted of the control section 7, driver section 8, and zero-cross detecting section 9 is provided for the switching elements Q1 and Q2 and the diodes D1 and D2 of the upper and lower arms corresponding to the U-phase winding. The control circuit 20 is also provided for each of the other phase windings. In the case of providing the control circuit 20 for each one of the phase windings, since the control circuit 20, and the switching elements and diodes of the upper and lower arms can be modularized as one semiconductor package, manufacture and assembly of the switching sections 5 and 6 and their control mechanisms can be made easy. Particularly, in the above embodiment, since on/off timings of the two switching elements of the upper and lower arms of each phase winding are set based on zero-cross points of its phase, it is possible to set on/off timings of the switching elements of each phase without using the phase voltages of the other phases even when the above modularization is implemented.

In the above embodiment, the vehicle generator 1 includes two a/mature windings 2 and 3, and two switching sections 5 and 6. However, the present invention is applicable to a vehicle generator including one armature winding and one switching section.

In the above embodiment, zero-cross points are used as references to set on/off timings of the switching elements Q1 and Q2 corresponding to the U-phase winding, and also as references to detect the rotational speed and variation of the rotational speed. However, the rotational speed and its variation may be detected based on zero-cross points of the other phase (the V-phase or W-phase winding included in its own armature winding 2, or X-phase, Y-phase or Z-phase winding included in the other armature winding 3), or zero-cross points of its own phase and the other phases. In the case of setting on/off timing to a time after lapse of a predetermined time from a reference time point, it is necessary to take into consideration the rotational speed and its variation as has been explained. By using zero-cross points of also another phase, it is possible to improve the detection accuracy of the rotational speed and its variation, to thereby improve the accuracy of setting on/off timings of the switching elements.

Although the vehicle generator according to the above embodiment includes two sets of the armature windings and the switching sections, the present invention is applicable to a vehicle generator including three or more sets of armature windings and switching sections.

The above explained preferred embodiments are exemplary of the invention of the present application which is described solely by the claims appended below. It should be understood that modifications of the preferred embodiments may be made as would occur to one of skill in the art.

What is claimed is:

1. A vehicle generator comprising:
   an armature winding including a plurality of phase windings;
   a switching section constituted as a bridge circuit including a plurality of pairs of an upper arm and a lower arm connected in series to rectify phase voltages induced in the phase windings, each of the upper and lower arms being constituted of a switching element parallel-connected with a diode; and
   a control section for controlling on/off timings of the switching elements;
   wherein the control section is configured to perform a switching operation to switch the switching section between a first operation state where, for each of the pairs of the upper and lower arms, the upper arm is turned off when a corresponding one of the phase voltages is higher than a battery voltage of a battery charged by the vehicle generator through the switching section and a second operation state where, for each of the pairs of the upper and lower arms, the upper arm is turned off after a corresponding one of the phase voltages becomes lower than the battery voltage, and configured to delay off timings to turn off the switching elements stepwise when the switching section is in the second operation state.

2. The vehicle generator according to claim 1, further comprising a zero-cross detecting section to detect, for each of the phase windings, time points at which polarity of a corresponding one of phase currents of the phase windings changes from positive to negative or from negative to positive as zero-cross points, the control section being configured to set the off timings based on the zero-cross points detected by the zero-cross detecting section.

3. The vehicle generator according to claim 1, wherein the control section switches the switching section to the second operation state when an output current of the vehicle generator exceeds an available value when the switching section is in the first operation state.

4. The vehicle generator according to claim 1, wherein the control section switches the switching section to the second operation state when variation of a rotational speed of the vehicle generator is within a predetermined range when the switching section is in the first operation state.

5. The vehicle generator according to claim 1, wherein the control section switches the switching section to the first operation state when an output current of the vehicle generator becomes lower than an available value after the output current exceeds the avail value when the switching section is in the second operation state.

6. The vehicle generator according to claim 5, wherein the control section does not switch the switching section to the first operation state unless variation of a rotational speed of the vehicle generator is within a predetermined range when the switching section is in the second operation state.

7. The vehicle generator according to claim 1, wherein the control section performs the switching operation at intervals longer than a predetermined time.

8. The vehicle generator according to claim 1, further comprising an excitation current control section to control an excitation current flowing to a field winding of the vehicle generator, the control section being configured to perform a coarse adjustment of an output current of the vehicle generator by varying the off timings of the switching elements stepwise, and a fine adjustment of the output current by varying the excitation current.

9. The vehicle generator according to claim 8, wherein variation of the output current between each adjacent off timings by the coarse adjustment is within an adjustable range of the output current by the fine adjustment.

10. The vehicle generator according to claim 1, wherein the control section turns off all the switching elements when variation of a rotational speed of the vehicle generator exceeds a predetermined range when the switching section is in the second operation state.

* * * * *